United States Patent
Rullaud et al.

(10) Patent No.: US 9,551,489 B2
(45) Date of Patent: Jan. 24, 2017

(54) TURBINE ENGINE COMBUSTION CHAMBER

(71) Applicant: SNECMA, Paris (FR)

(72) Inventors: Matthieu Francois Rullaud, Moissy Cramayel (FR); Michel Pierre Cazalens, Moissy Cramayel (FR)

(73) Assignee: SNECMA, Paris (FR)

( * ) Notice: Subject to any disclaimer, the term of this patent is extended or adjusted under 35 U.S.C. 154(b) by 425 days.

(21) Appl. No.: 14/241,319

(22) PCT Filed: Sep. 25, 2012

(86) PCT No.: PCT/FR2012/052130
§ 371 (c)(1),
(2) Date: Feb. 26, 2014

(87) PCT Pub. No.: WO2013/045802
PCT Pub. Date: Apr. 4, 2013

(65) Prior Publication Data
US 2014/0223912 A1    Aug. 14, 2014

(30) Foreign Application Priority Data

Sep. 26, 2011   (FR) ..................................... 11 58573

(51) Int. Cl.
*F23R 3/00*   (2006.01)
*F23R 3/06*   (2006.01)

(52) U.S. Cl.
CPC ................. *F23R 3/002* (2013.01); *F23R 3/06* (2013.01); *Y02T 50/675* (2013.01)

(58) Field of Classification Search
CPC ............ F23R 3/002; F23R 3/06; Y02T 50/675
USPC ..................................... 60/722, 39.827, 752
See application file for complete search history.

(56) References Cited

U.S. PATENT DOCUMENTS

| | | | | |
|---|---|---|---|---|
| 6,070,412 A | * | 6/2000 | Ansart | F23R 3/04 60/746 |
| 2008/0127651 A1 | * | 6/2008 | Zupanc | F23R 3/06 60/752 |
| 2009/0084110 A1 | * | 4/2009 | Dudebout | F23R 3/06 60/754 |

(Continued)

FOREIGN PATENT DOCUMENTS

FR    2 950 415    3/2011

OTHER PUBLICATIONS

International Search Report Issued Nov. 22, 2012 in PCT/FR12/052130 Filed Sep. 25, 2012.

(Continued)

*Primary Examiner* — Steven A. Reynolds
(74) *Attorney, Agent, or Firm* — Oblon, McClelland, Maier & Neustadt, L.L.P.

(57) ABSTRACT

An annular combustion chamber for a turbine engine, the chamber including an inner wall and an outer wall forming surfaces of revolution, the walls being connected together by a chamber end wall fitted with a fuel injection mechanism, each of the inner and outer walls including primary holes and dilution holes situated downstream from the primary holes in a gas flow direction, the primary and dilution holes being regularly distributed around the circumference of the inner and outer walls. The outer wall has a greater number of dilution holes than the inner wall.

14 Claims, 3 Drawing Sheets

(56) References Cited

U.S. PATENT DOCUMENTS

| | | | |
|---|---|---|---|
| 2009/0139239 A1* | 6/2009 | Zupanc | F23R 3/06 60/740 |
| 2009/0266080 A1* | 10/2009 | Pieussergues | F01D 9/023 60/746 |
| 2010/0162712 A1* | 7/2010 | Zupanc | F23R 3/06 60/747 |
| 2010/0218503 A1* | 9/2010 | Bronson | F23R 3/06 60/754 |
| 2010/0218504 A1* | 9/2010 | Bronson | F23R 3/045 60/754 |
| 2012/0186222 A1* | 7/2012 | Commaret | F23R 3/06 60/39.827 |

OTHER PUBLICATIONS

French Search Report Issued Apr. 20, 2012 in French Application No. 1158573 Filed Sep. 26, 2011.

* cited by examiner

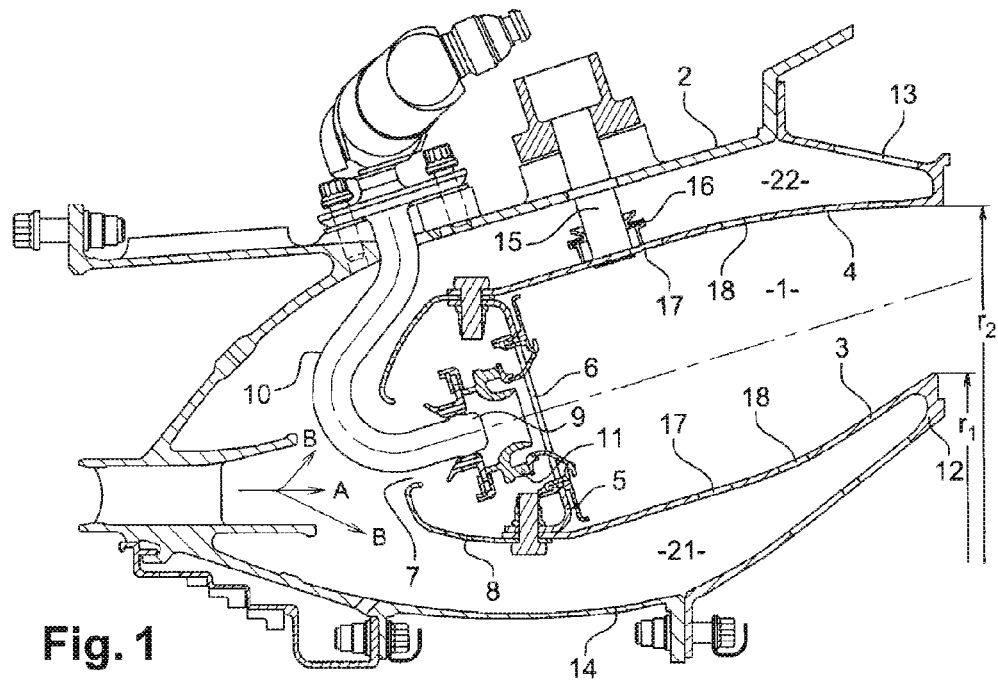
Fig. 1
Background Art
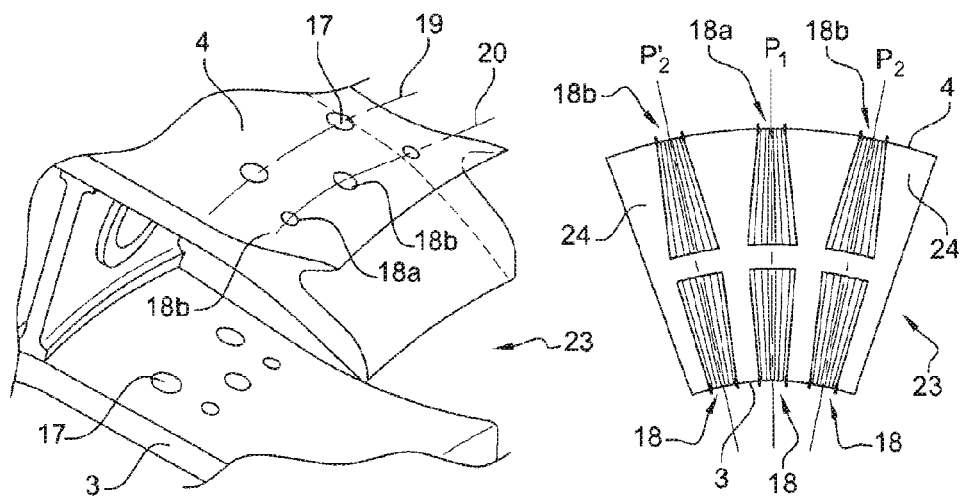
Fig. 2
Background Art
Fig. 3
Background Art U.S. Patent     Jan. 24, 2017     Sheet 2 of 3     US 9,551,489 B2
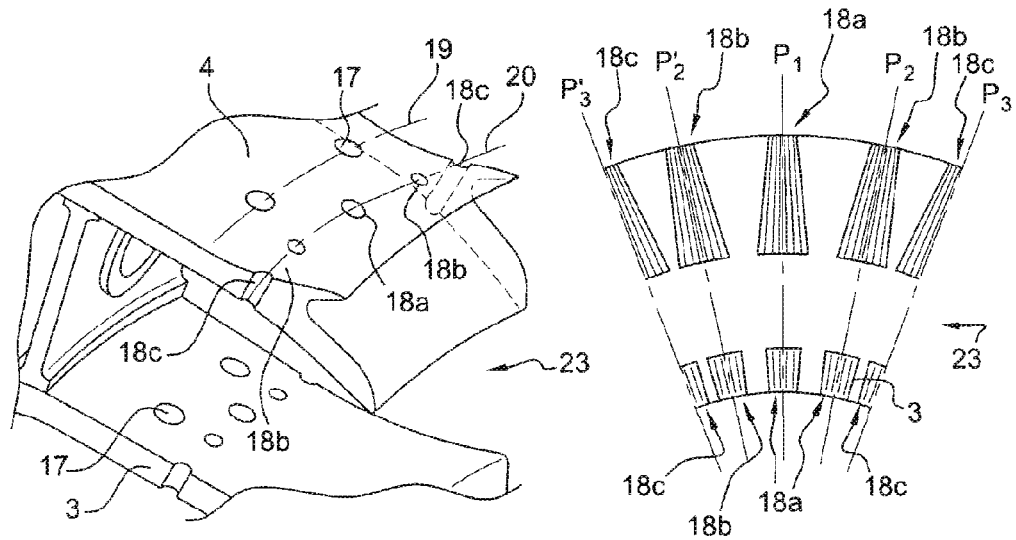
Fig. 4
Background Art
Fig. 5
Background Art
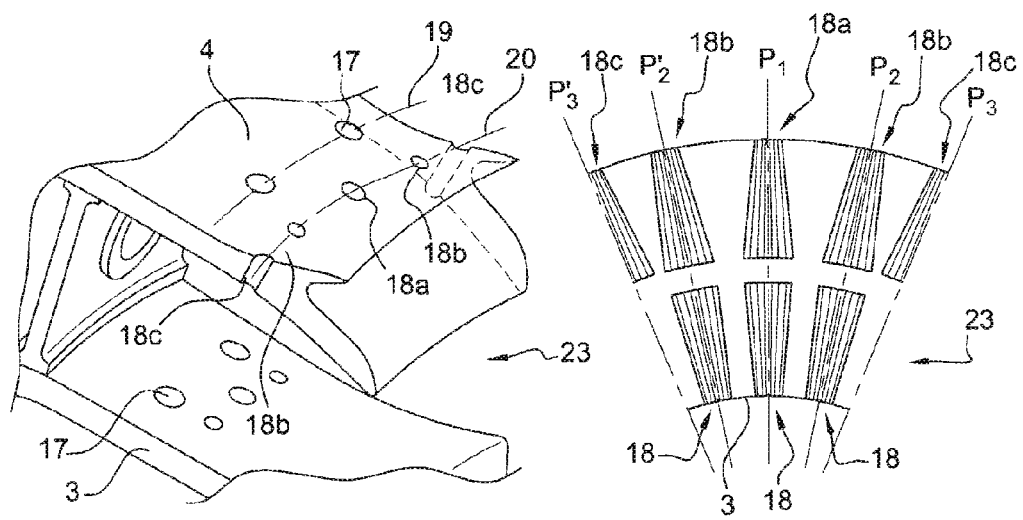
Fig. 6
Fig. 7

TURBINE ENGINE COMBUSTION CHAMBER

The present invention relates to a turbine engine combustion chamber.

In a turbine engine, one or more compressor stages feed a combustion chamber with air under pressure, where the air is mixed with fuel. The mixture is ignited and it generates hot combustion gas that flows downstream from the chamber towards one or more turbine stages that are entrained in rotation. The turbines entrain the compressor stages, in order to compress air upstream from the combustion chamber.

An annular combustion chamber comprises an inner wall and an outer wall forming surfaces of revolution that are connected together at their upstream ends by a chamber end wall fitted with fuel injection means.

Such injection means comprise in particular a series of fuel injectors together with means for feeding the air coming from the compressor around the injectors so as to vaporize the injected liquid fuel. Spark plugs enable the fuel mixed with air to be ignited inside the combustion chamber.

In general, the inner and outer walls of the chamber have holes known as "primary" holes and also holes known as "dilution" holes that are situated downstream from the primary holes. These holes are regularly distributed around the entire circumference of each of the walls.

Air is injected simultaneously around the injectors and through the primary holes so that the air/fuel mixture is present in the upstream portion of the chamber in proportions that are substantially stoichiometric, thus making it possible to obtain good combustion efficiency and maximum reaction rate. Reaction rate is the rate at which one of the components of the air/fuel mixture disappears.

The temperature of the gas obtained by combustion is very high, for example about 2000° C. The gas as produced in this way must therefore be cooled in order to avoid damaging the chamber and the turbine.

To do this, air from the compressor is injected through the inner and outer walls of the chamber via the dilution holes. The cooler dilution air penetrates into the stream of gas generated by the combustion and is mixed therewith. The temperature profile of the gas leaving the combustion chamber can thus be adjusted as a function of thermal constraints.

Other means are also provided for cooling the walls of the chamber.

The combustion chamber may be subdivided into a plurality of angular sectors, each including an injector. In each sector, the inner and outer walls have an identical number of dilution holes, e.g. equal to three.

Studies carried out by the Applicant have shown that the combustion gas is cooled better in the radially inner portion of the combustion chamber than in its radially outer portion.

This is due in particular to the fact that, since the diameter of the outer wall is greater than the diameter of the inner wall, the spacing between the dilution holes is greater in the outer wall than in the inner wall, when the inner and the outer walls both have the same numbers of dilution holes.

A portion of the hot gas from the combustion can thus pass through the dilution hole zone along the outer wall while bypassing the cool air that is injected through those holes, in particular at the circumferential ends of each sector.

In order to remedy this, proposals have been made to use inner and outer walls in which each has four holes per angular sector.

Nevertheless, under such circumstances, the studies carried out by the Applicant have shown that although the hot combustion gas is cooled correctly in the radially outer portion of the chamber, it is no longer cooled correctly in the radially inner portion.

This can be explained by the facts that the number of dilution holes in the inner wall is increased and the flow rate of cool air passing through the inner surface is the same as before, and as a result the air passing through these dilution holes penetrates less deeply into the hot combustion gas. The cool air is thus mixed less effectively with the stream of hot gas in the radially inner portion of the combustion chamber.

A particular object of the invention is to provide a solution to this problem that is simple, effective, and inexpensive.

For this purpose, the invention proposes an annular combustion chamber for a turbine engine, the chamber comprising an inner wall and an outer wall forming surfaces of revolution, the walls being connected together by a chamber end wall fitted with fuel injection means, each of said inner and outer walls having primary holes and dilution holes situated downstream from the primary holes in the gas flow direction, said primary and dilution holes being regularly distributed around the circumference of the inner and outer walls, the chamber having n injectors and being subdivided into n angular sectors, the chamber being characterized in that in each angular sector, the outer wall has a central dilution hole situated in a radial plane oriented along the axis of the corresponding injector, two dilution half-holes situated at the circumferential ends of the angular sector, and two other dilution holes, referred to as "middle" holes, situated on either side of said radial plane between the central hole and the end half-holes, and in that, in each angular sector, the inner wall has a central dilution hole situated in the radial plane oriented along the axis of the corresponding injector, with two other dilution holes being situated on either side of said radial plane.

Thus, the space between the dilution holes in the outer wall can be made smaller so as to prevent the hot combustion gas bypassing the cool air passing through the dilution holes. Also, the limited number of dilution holes in the inner wall makes it possible to ensure effective cooling of the hot gas.

Furthermore, such an arrangement of the holes ensures that the cool air is distributed effectively at the outer wall and makes it possible to obtain the desired temperature profile together with a uniform distribution of temperatures in the circumferential direction.

The diameter of the central dilution hole of each sector of the outer wall may be greater than the diameter of the other dilution holes of the sector.

The central dilution hole is situated on the axis of the injector, i.e. on the middle axis along which drops of fuel are projected. The stream of hot gas is thus stronger in the zone situated in register with the central dilution hole. The middle hole of larger diameter thus enables more cool air to be brought into this zone.

By way of nonlimiting example, the diameter of the central hole in each sector of the outer wall lies in the range 6 millimeters (mm) to 7 mm, the diameter of the middle holes in the sector lies in the range 5 mm to 6 mm, and the diameter of the end half-holes in this sector lies in the range 4 mm to 5 mm.

Such an arrangement of the holes provides an effective distribution of cool air at the inner wall.

Furthermore, the diameter of the central dilution hole in each sector of the inner wall may be greater than the diameter of the other dilution holes in this sector, thus making it possible, as mentioned above, to improve the cooling of the hot combustion gas.

By way of example, the diameter of the central hole in each sector of the inner wall lies in the range 7 mm to 8 mm, the diameter of the other dilution holes in the sector lying in the range 6 mm to 7 mm.

Preferably, the dilution holes in a given wall are in alignment on the same circumference.

The invention also provides a turbine engine such as an airplane turboprop or turbojet including a combustion chamber of the above-specified type.

The invention can be better understood and other details, characteristics, and advantages invention appear on reading the following description made by way of nonlimiting example and with reference to the accompanying drawings, in which:

FIG. 1 is an axial section view of a prior art combustion chamber;

FIG. 2 is a diagrammatic perspective view of an angular sector of a combustion chamber in a first embodiment of the prior art;

FIG. 3 is a diagrammatic view of the FIG. 2 angular sector, in a radial section through the dilution holes;

FIGS. 4 and 5 are views corresponding respectively to FIGS. 2 and 3, showing a second embodiment of the prior art;

FIGS. 6 and 7 are views corresponding respectively to FIGS. 2 and 3, showing an embodiment of the invention.

Figure 8:
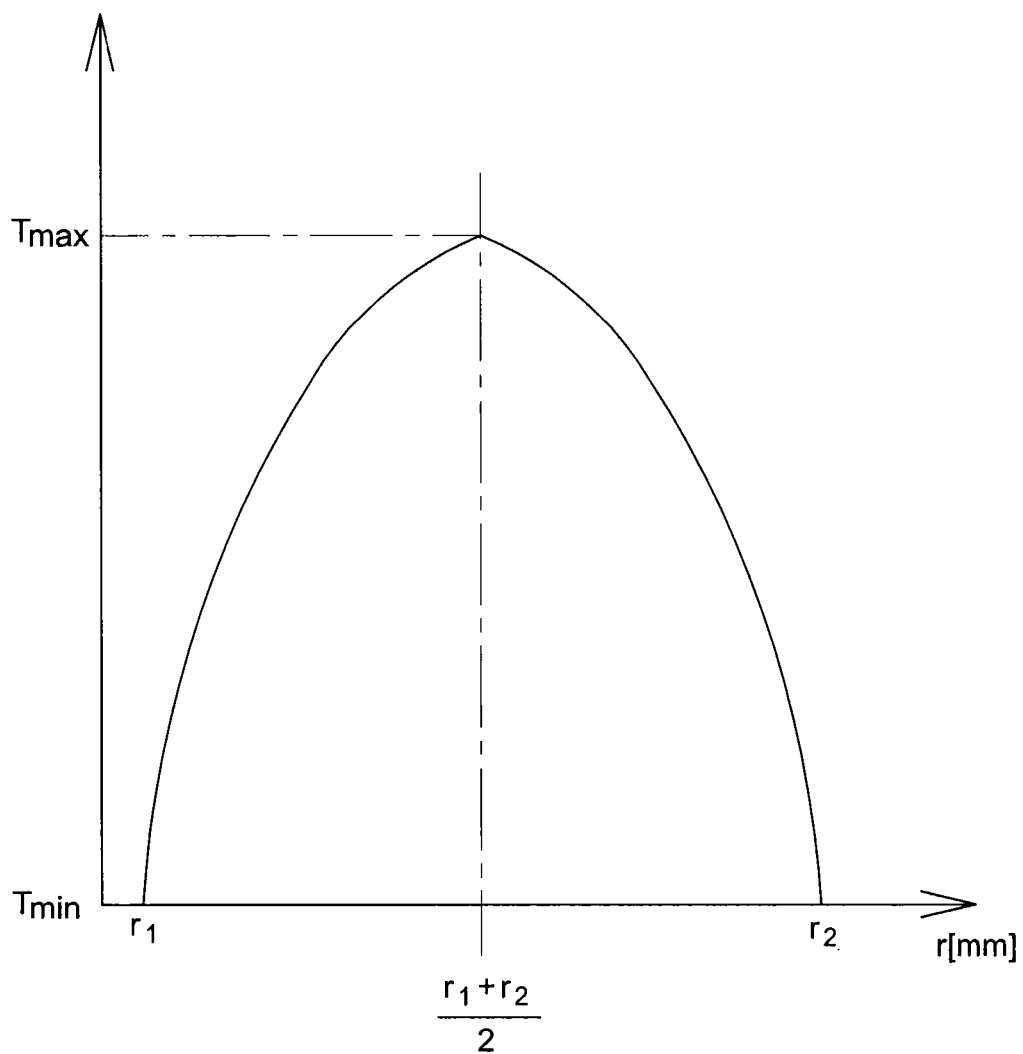
FIG. 8 is a diagram showing the temperature profile desired at the outlet from the combustion chamber.

Reference is made initially to FIG. 1, which shows an annular combustion chamber 1 of a turbine engine such as an airplane turboprop or turbojet, which combustion chamber is arranged between an upstream high-pressure compressor and a downstream high-pressure turbine.

The combustion chamber 1 is mounted inside an outer casing 2 and comprises inner and outer walls 3 and 4 forming surfaces of revolution that are connected at their upstream ends to an annular chamber end wall 5 having orifices 6 in alignment with orifices 7 in an annular fairing 8 extending upstream and fastened on the chamber end wall 5. Injector heads 9 are mounted between the fairing 8 and the chamber end wall 5, and they are in alignment with the orifices 6 in the chamber end wall 5. The injector heads 9 are connected to fuel feed ducts 10 passing through the orifices 7 in the fairing 8 and carried by the outer casing 2. Injection systems 11 are arranged around the injector heads 9 in the orifices 6 in the chamber end wall 5.

In the example shown, the downstream ends of the inner and outer walls are connected to fastener flanges 12, 13 on an inner casing 14 and on the outer casing 2, respectively.

At least one spark plug 15 is carried by the outer casing 2 and is engaged in guide means 16 carried by the outer wall 4.

Each of the inner and outer walls 3 and 4 of the chamber 1 carries a circumferential row of primary holes 17 and a circumferential row of dilution holes 18. The dilution holes 18 are situated downstream from the primary holes 17 in the gas flow direction. The axial distance between the circumference 19 on which the primary holds 17 are located and the circumference 20 on which the dilution holes 18 are located (distance between the axes of the holes 17, 18) lies in the range 10 mm to 40 mm, for example.

In operation, the air leaving the high-pressure compressor splits into a stream of air entering into the inside of the combustion chamber and mixing with the fuel (arrow A) and a stream of air bypassing the chamber (arrows B). The bypass stream of air flows in the annular space 21 between the inner casing 14 and the inner wall 3 and also in the annular space 22 between the outer casing 2 and the outer wall 4. A portion of the bypass air is for passing through the primary holes 17 and the dilution holes 18.

In this way, air is injected both around the injection head 9 through the injection system 11, and also through the primary holes 17 so that the air/fuel mixture that is present in the upstream portion of the chamber 1, is in substantially stoichiometric proportions. This makes it possible to obtain good combustion efficiency and a maximum rate of reaction.

Downstream from the primary holes 17, the hot gas from the combustion is mixed with the cooler air passing through the dilution holes 18. The profile of the temperature of the gas leaving the combustion chamber 1 can thus be adjusted as a function of thermal constraints.

The combustion chamber 1 may be subdivided into as many angular sectors as there are injectors 9. Below it is assumed that the combustion chamber has twenty injectors 9. The combustion chamber 1 can thus be subdivided into twenty angular sectors, each extending circumferentially over 18°. The term "angular sectors" is a manner of speaking to facilitate describing the combustion chamber 1. Specifically, there need not necessarily be any genuinely distinct angular sectors that are fastened to one another.

The reference $P_1$ designates the radial plane containing the axis of the injector, the references $P_2$ and $P'_2$ designate the radial planes forming respective angles at +4.5° and at −4.5° relative to the plane $P_1$, and the references $P_3$ and $P'_3$ designate the radial planes forming respective angles of +9° and of −9° relative to the plane $P_1$, i.e. the planes passing through the circumferential ends of the corresponding sector 23.

In the embodiment of FIGS. 2 and 3, each of the inner and outer walls 3 and 4 of the sector 23 has three dilution holes 18.

For each of the inner and outer surfaces 3 and 4, a "central" dilution hole 18a is formed at the intersection between the circumference 20 of the dilution holes and the plane $P_1$. Two other dilution holes 18b are located at the intersections between the circumference 20 and the planes $P_2$ and $P'_2$, respectively.

Nevertheless, as mentioned above, the combustion gas is better cooled in the radially inner portion of the combustion chamber 1 than in the radially outer portion.

The causes for this phenomenon are shown diagrammatically in FIG. 3.

In this figure, it can be seen that the air penetrating into the combustion chamber 1 via the dilution holes 18 in the inner wall 3 is distributed in relatively uniform manner throughout the radially inner portion of the chamber 1.

In contrast, the cool air that penetrates via the dilution holes 18 in the outer wall 4 is not distributed uniformly because the zones situated at the circumferential ends are deprived of dilution holes and are fed with little cool air.

The hot gas from combustion is poorly cooled in these end zones 24, such that the gas stream leaving the combustion chamber 1 does not present the desired temperature profile and is not uniform over the entire circumference of the chamber.

In order to remedy that, proposals have been made to use inner and outer walls 3 and 4, each having four holes per angular sector 23, as shown in FIGS. 4 and 5.

In this embodiment, each of the inner and outer walls 3 and 4, has a central dilution hole 18a situated at the intersection between the circumference 20 of the dilution holes and the plane $P_1$. Two other dilution holes 18b are located at the intersections between the circumference 20 and the planes $P_2$ and $P'_2$, respectively. Finally, two half-holes 18c are located at the intersections between the circumference 20 and the planes P₃ and P'₃, respectively. Together with the half-holes of the adjacent angular sectors, the two half-holds 18c form complete holes similar to the holes 18b, for example.

Nevertheless, as mentioned above, the Applicant has found that, in this embodiment, although the hot gas from the combustion is cooled correctly in the radially outer portion of the chamber 1, it is no longer cooled correctly in the radially inner portion.

Specifically, and as shown diagrammatically in FIG. 5, the increase in the number of dilution holes 18 in the inner wall 3 reduces the depth to which the cool air passing through these holes 18 penetrates into the hot combustion gas (for a given flow rate of cooling air). The cool air is thus mixed less effectively with the stream of hot gas in the radially inner portion of the combustion chamber 1.

The invention seeks to remedy the above-mentioned drawbacks, by proposing a combustion chamber 1 in which the outer wall 4 has a greater number of dilution holes 18 than does the inner wall 3.

An embodiment of the invention is shown in FIGS. 6 and 7. In these figures, for each angular sector 23, the outer wall 4 of the chamber has four dilution holes while the inner wall 3 has three dilution holes.

More particularly, the outer wall 4 has a central dilution hole 18a situated at the intersection between the circumference 20 of the dilution holes and the plane $P_1$. Two other dilution holes 18b are located at the intersections between the circumference 20 and the planes $P_2$ and $P'_2$, respectively. Finally, two half-holes 18c are situated at the intersections between the circumference 20 and the planes $P_3$ and $P'_3$. Together with the adjacent angular sectors, the two half-holes 18c form complete holes similar to the holes 18b.

Also, the outer wall 3 has a "central" dilution hole 18a situated at the intersection between the circumference 20 of the dilution holes and the plane $P_1$. Two other dilution holes 18b are located at the intersections between the circumference 20 and the planes $P_2$ and $P'_2$, respectively.

The diameters of the central dilution holes 18a of the inner and outer walls 3 and 4 are greater than the diameters of the other dilution holes 18b, 18c of said walls.

More particularly, the diameter of the central dilution hole 18a in the outer wall 4 lies in the range 6 mm to 7 mm, the diameter of the holes 18b in the outer wall lies in the range 5 mm to 6 mm, and the diameter of the half-holes 18c in the outer wall 4 lies in the range 4 mm to 5 mm.

Also, the diameter of the central hole 18a in the inner wall 3 lies in the range 7 mm to 8 mm, and the diameter of the other dilution holes 18b in the inner wall 3 lies in the range 6 mm to 7 mm.

In an embodiment, the downstream ends of the dilution holes 18a and 18b are in alignment on the same circumference: the centers of the holes 18b are then not in alignment on the circumference containing the centers of the holes 18a when the holes 18a and 18b are of different diameters.

Such a combustion chamber 1 makes it possible to mix the hot combustion gas with cooler air coming from the compressor and passing through the dilution holes 18 more effectively and in determined manner. This makes it possible to obtain the desired temperature profile at the outlet from the combustion chamber 1 or at the inlet to the turbine.

This desired temperature profile is shown in FIG. 8, and it is in the form of a parabola with minimum values $T_{min}$ that are reached at the downstream ends of the inner and outer walls 3 and 4, and with radii that are respectively $r_1$ and $r_2$ (see also FIG. 1). The maximum value $T_{max}$ is reached in a middle radial zone of radius $(r_1+r_2)/2$. By way of example, $T_{min}$ lies in the range 1300 K to 1600 K and $T_{max}$ lies in the range 1900 K to 2000 K. Also, by way of example, $r_1$ is about 200 mm and $r_2$ is about 250 mm.

The invention makes it possible to achieve a real temperature profile at the outlet from the combustion chamber that departs from the desired profile (FIG. 8) by no more than 20° C., with this applying over the entire circumference of the combustion chamber and for all values of r in the range $r_1$ to $r_2$.

The invention thus makes it possible to comply with the thermal specifications imposed by the turbine situated directly downstream from the combustion chamber, thus avoiding premature damage to the turbine and to the walls 3, 4 of the combustion chamber.

By way of comparison, the combustion chambers of the prior art, as shown in FIGS. 1 to 5, have real temperature profiles that may depart by more than 20° C. from the desired profile, in certain zones. Such departures give rise to so-called "hot" zones or pockets being formed, that are localized and harmful, in particular for the turbine situated downstream from the combustion chamber.

In contrast, in the invention, the particular structure of the inner and outer walls 3, 4 provides good temperature uniformity in the circumferential direction, and makes it possible to comply with the desired temperature profile so as to avoid any damage.

The invention claimed is:

1. An annular combustion chamber for a turbine engine, the chamber comprising:
    an inner wall and an outer wall forming surfaces of revolution, the inner and outer walls being connected together by a chamber end wall fitted with a fuel injection device, each of the inner and outer walls including primary holes and dilution holes situated downstream from the primary holes in a gas flow direction, the primary and dilution holes being regularly distributed around a circumference of the inner and outer walls;
    the chamber including n injectors and being subdivided into n angular sectors,
    wherein in each angular sector, the outer wall includes a central dilution hole situated in a radial plane oriented along an axis of a corresponding injector of the injectors, two dilution half-holes situated at circumferential ends of the angular sector, and two other middle dilution holes situated on either side of the radial plane between the central hole and the end half-holes; and
    wherein, in each angular sector, the inner wall includes a central dilution hole situated in the radial plane oriented along the axis of the corresponding injector, with two other dilution holes being situated on either side of the radial plane.

2. A combustion chamber according to claim 1, wherein a diameter of the central dilution hole of each sector of the outer wall is greater than a diameter of the other dilution holes of the sector.

3. A combustion chamber according to claim 1, wherein a diameter of the central hole in the sector of the outer wall is in a range of 6 mm to 7 mm, a diameter of the middle holes in the sector is in a range of 5 mm to 6 mm, and a diameter of the end half-holes is in a range of 4 mm to 5 mm.

4. A combustion chamber according to claim 1, wherein a diameter of the central dilution hole in the sector of the inner wall is greater than a diameter of the other dilution holes in the sector.

5. A combustion chamber according to claim 4, wherein a diameter of the central hole in the sector of the inner wall is in a range of 7 mm to 8 mm, and the diameter of the other dilution holes in the sector is in a range of 6 mm to 7 mm.

6. A combustion chamber according to claim 1, wherein the dilution holes in a given wall are in alignment on a same circumference.

7. A turbine engine, an airplane turboprop, or a turbojet comprising a combustion chamber according to claim 1.

8. A combustion chamber according to claim 1, wherein in each angular sector, the outer wall includes the central dilution hole situated in the radial plane oriented along the axis of the corresponding injector, the two dilution half-holes situated at the circumferential ends of the angular sector, and only two of the other middle dilution holes situated on either side of the radial plane between the central hole and the end half-holes.

9. A combustion chamber according to claim 1, wherein in each angular sector, the inner wall does not include any half-holes.

10. A combustion chamber according to claim 1, wherein downstream ends of the central dilution hole and the two other middle dilution holes in the outer wall are in alignment on a same circumference.

11. A combustion chamber according to claim 1, wherein all of the dilution holes in a given wall are in alignment on a same circumference.

12. A combustion chamber according to claim 1, wherein in each angular sector, the inner wall includes two primary holes.

13. A combustion chamber according to claim 1, wherein in each angular sector, the outer wall includes two primary holes.

14. A combustion chamber according to claim 1, wherein the primary holes in a given wall are in alignment on a same circumference.

* * * * *